United States Patent
Maro

(10) Patent No.: US 6,760,279 B1
(45) Date of Patent: Jul. 6, 2004

(54) MAGNETO-OPTICAL STORAGE APPARATUS HAVING THE RELATION BETWEEN NUMERICAL APERTURE AND RECORDING MEDIUM

(75) Inventor: Tsuyoshi Maro, Ibaraki (JP)

(73) Assignee: Hitachi Maxell, Ltd., Osaka (JP)

( * ) Notice: Subject to any disclaimer, the term of this patent is extended or adjusted under 35 U.S.C. 154(b) by 218 days.

(21) Appl. No.: 10/049,518

(22) PCT Filed: Oct. 13, 2000

(86) PCT No.: PCT/JP00/07128

§ 371 (c)(1),
(2), (4) Date: Feb. 13, 2002

(87) PCT Pub. No.: WO01/27919

PCT Pub. Date: Apr. 19, 2001

(30) Foreign Application Priority Data

Oct. 15, 1999 (JP) .......................................... 11-293684

(51) Int. Cl.$^7$ .............................................. G11B 11/00
(52) U.S. Cl. ...................................... 369/13.4; 428/64.3
(58) Field of Search ............................. 369/13.4, 13.38, 369/13.35, 13.39, 275.5; 428/64.3, 694 ML

(56) References Cited

U.S. PATENT DOCUMENTS

| | | | | |
|---|---|---|---|---|
| 5,838,646 A | * | 11/1998 | Watanabe et al. | 369/13.53 |
| 5,978,320 A | * | 11/1999 | Nakaoki et al. | 369/13.32 |
| 6,041,031 A | * | 3/2000 | Ichimura et al. | 369/13.32 |
| 6,091,694 A | | 7/2000 | Spath | |
| 6,111,841 A | * | 8/2000 | Iida et al. | 369/47.53 |
| 6,141,297 A | * | 10/2000 | Kim | 369/13.42 |
| 6,160,769 A | * | 12/2000 | Ohnuki et al. | 369/13.13 |
| 6,496,450 B2 | * | 12/2002 | Watanabe | 369/13.38 |
| 6,625,107 B2 | * | 9/2003 | Kawano | 369/275.5 |

FOREIGN PATENT DOCUMENTS

| JP | 3-8153 | 1/1991 | |
|---|---|---|---|
| JP | 3-178061 | 8/1991 | |
| JP | 3-178062 | 8/1991 | |
| JP | 5-81717 | 4/1993 | |
| JP | 5-205336 | 8/1993 | |
| JP | 6-84222 A | * 3/1994 | ................ 369/13.4 |
| JP | 11-3534 | 1/1999 | |
| JP | 11-7657 | 1/1999 | |
| JP | 2000-21041 | 1/2000 | |
| JP | 2000-100008 | 4/2000 | |
| JP | 2000-215539 | 8/2000 | |
| JP | 2000-339660 | 12/2000 | |

* cited by examiner

Primary Examiner—Tan Dinh
(74) Attorney, Agent, or Firm—Birch, Stewart, Kolasch & Birch, LLP

(57) ABSTRACT

An object of the present invention is to provide a film-surface light-incident type magneto-optical recording medium which is used by means of an objective lens having a large NA value and is excellent in productivity and yield, and a magneto-optical recording apparatus. According to the present invention, there is provided a magneto-optical recording medium for conducting recording or reading-out from the film surface side of the recording medium by traveling of a flying head incorporated with an objective lens having a numerical aperture (NA) of not more than 0.95 and not less than 0.8, wherein at least a reflective film, a recording layer, a transparent dielectric layer, a transparent resin layer and a lubricant layer are laminated on a substrate in that order.

10 Claims, 2 Drawing Sheets

MAGNETO-OPTICAL STORAGE APPARATUS HAVING THE RELATION BETWEEN NUMERICAL APERTURE AND RECORDING MEDIUM

This application is the national phase under 35 U.S.C. § 371 of PCT International Application No. PCT/JP00/07128 which has an International filing date of Oct. 13, 2000, which designated the United States of America.

TECHNICAL FIELD

The present invention relates to a magneto-optical recording medium for conducting recording or reading-out by irradiation with laser beams from the film surface side of the recording medium by using a flying head equipped with an objective lens having a large NA value.

BACKGROUND ART

In recent years, optical recording apparatus for recording a large amount of data at a high density and rapid recording or reading-out thereof have been noted with the development of multimedia. As the optical recording apparatus, there are those using a disc intended only for reading-out which permits only reading-out of information because it is produced by stamping of the information on the disc, such as CD and Laser Discs; those using a direct read after write disc which permits recording only once, such as CD-R; and those using a rewritable disc which permits rewriting and deletion of data any number of times by the use of a magneto-optical recording method or a phase-change recording method. Of these optical recording apparatus, magneto-optical recording apparatus are mainly used in fields where a high transfer rate is required. Data are read out or recorded by using a light spot obtained by focusing laser beams to the limit of diffraction by the use of a lens. When the wavelength of the laser beams is taken as $\lambda$ and the numerical aperture of the lens as NA, the size of the light spot is about $\lambda$/NA (Yoshihito Tsunoda (a chief editor) "Fundamentals and Practice of Optical Disc Storage", The Institute of Electronic Information and Communication of Japan (1995), p.65). For recording or reading out a higher-density pattern, i.e., a smaller pattern, a smaller laser beam spot is required. For reducing the size of the light spot, two methods, i.e., a method of reducing the wavelength of the laser beams ($\lambda$) and a method of increasing the numerical aperture (NA) of the lens are thought of on the basis of the above expression. When the half angle of diaphragm is taken as $\theta$, the numerical aperture (NA) of the lens is expressed by the equation: NA=sin $\theta$ and has a value of less than 1. NA of an objective lens used in an optical recording apparatus put to practical use is at most about 0.6. This is because the coma and astigmatism caused when the optical axis of the objective lens is tilted relative to the substrate become remarkable with an increase of NA. For solving this problem, it is important to reduce the thickness of a light-transmittable transparent layer (corresponding to the thickness of a substrate in a conventional optical recording apparatus) and prevent the optical axis of the objective lens from tilting relative to the substrate. Therefore, the following optical recording medium and a process for production thereof have been disclosed: recording or reading-out is conducted by pressing a slider equipped with an objective lens and the like against the surface of the transparent resin layer of a recording medium comprising a substrate, grooves or pits formed on the substrate for obtaining signals at the time of tracking, address signals and the like, a recording layer including a reflective layer and formed on the substrate having the grooves or pits, and the transparent resin layer of about 0.1 mm in thickness formed on the recording layer (Japanese Patent Kokai No. 8-235638). This optical recording medium is disadvantageous in that the transparent resin layer is liable to be injured by the sliding of the slider on the transparent resin layer because the slider is moved while being pressed against the transparent resin layer. The transparent resin layer on the reflective film and the recording film is formed by spin-coating an ultraviolet-setting resin or adhering a transparent resin film. When the transparent resin film is adhered, the adhesion has to be carried out so that no air accumulation portion or bubble may be formed by the intrusion of air into the space between the resin film and the recording film. Therefore, the productivity is not sufficient. Even when a layer of the ultraviolet-setting resin of about 0.1 mm in thickness is formed, this thickness is approximately 5 to 10 times the thickness of 10 to 20 $\mu$m of the protective film of a conventional recording media. Therefore, the viscosity of the resin has to be set at a considerably high value. In this case, there are problems such as the insufficient uniformity of the transparent resin layer and the formation of air bubbles by the intrusion of air, so that the productivity and the yield are not sufficient as in the case of the adhesion of the transparent film.

On the other hand, a near-field optical recording and reading-out method has been proposed in which NA of an objective lens is effectively increased by using near-field light by casting light on a recording medium through a solid hemispherical lens (SIL) to form an image on the recording medium and adjusting the distance between SIL and the surface of the optical recording medium to about ¼$\lambda$ ($\lambda$: laser wavelength) (U.S. Pat. No. 5,125,750). Even in this technique, when the laser wavelength is 650 nm, the distance between the underside of SIL and the surface of the recording medium is as narrow as about 160 nm, so that there are problems such as scratches of the recording medium surface given by SIL.

The present invention was made in order to remove the defects of the above-mentioned prior arts and is intended to provide a film-surface light-introduction type magneto-optical recording medium which is used by means of an objective lens having a large NA value and is excellent in resistance to sliding, productivity and yield, and a magneto-optical recording apparatus.

DISCLOSURE OF THE INVENTION

In order to achieve the above object, there is provided as a first aspect of the present invention a magneto-optical recording medium for conducting recording or reading-out from the film surface side of the recording medium by traveling of a flying head incorporated with an objective lens having a numerical aperture (NA) of not more than 0.95 and not less than 0.8, wherein at least a reflective film, a recording layer, a transparent dielectric layer, a transparent resin layer and a lubricant layer are laminated on a substrate in that order.

As a second aspect of the present invention, there is provided a magneto-optical recording apparatus which uses a magneto-optical recording medium obtained by laminating at least a reflective film, a recording layer, a transparent dielectric layer and a lubricant layer on a substrate in that order, and in which a flying head incorporated with an objective lens having a numerical aperture (NA) of not more than 0.95 and not less than 0.8 is located so as to face the film surface side of the magneto-optical recording medium.

Employment of the above structure makes it possible to attain a much higher packing density than before.

Figure 1:
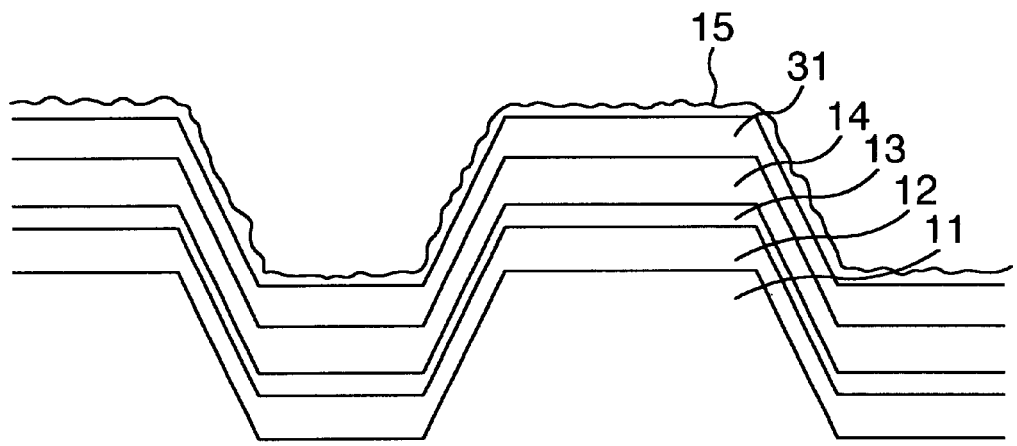
FIG. 1 is a sectional schematic view illustrating the structure of the recording medium of the present invention.

In these drawings, the reference numerals denote the following.
11: substrate,
12: reflective layer,
13: recording layer,
14: transparent dielectric layer,
15: lubricant layer,
21: objective lens,
22: flying head,
23: recording-medium,
24: reflective mirror,
25: magnetic-field producing coil,
31: transparent resin layer,
41: transparent dielectric layer,
101: first lens,
102: second lens,
103: substrate for a magnetic-field modulating coil,
104: magnetic-field modulating coil.

BEST MODE FOR CARRYING OUT THE INVENTION

Figure 2:
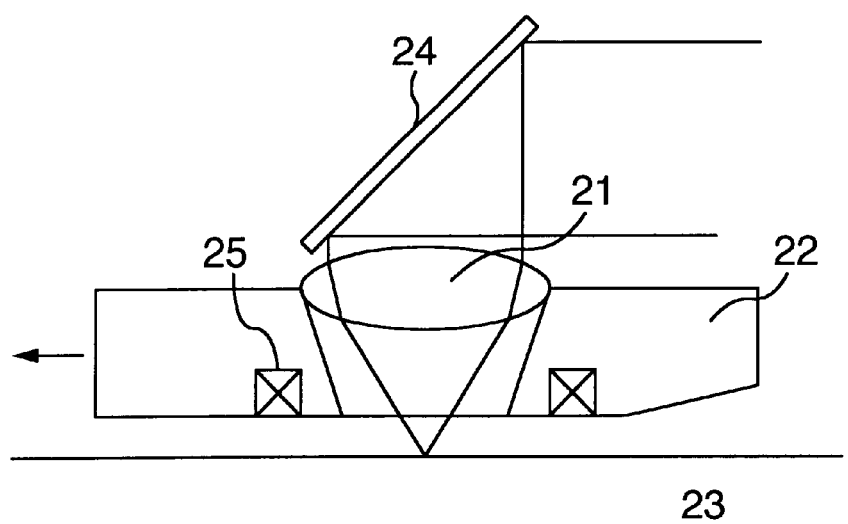
FIG. 2 is a schematic illustration of the flying head used in the present invention.

In the present invention, the following structure of a magneto-optical recording apparatus is preferably employed. There is used such a magneto-optical recording medium as is shown in FIG. 1, i.e., a magneto-optical recording medium obtained by laminating at least a reflective film (12), a recording layer (13), a transparent dielectric layer (14), a transparent resin layer (31) and a lubricant layer (15) in that order on a substrate (11) having lands or grooves formed thereon so that land recording or groove recording at a track pitch of 0.9 µm or less can be conducted. As shown in FIG. 2, recording or reading-out is conducted from the film surface side of the recording medium by traveling of a flying head (22) incorporated with an objective lens (21) having a numerical aperture (NA) of not more than 0.95 and not less than 0.8, on the magneto-optical recording medium (23). A coil (25) for producing a magnetic field required for recording is formed on the underside of the flying head, and a mirror (24) for introducing laser beams into the objective lens is located over the objective lens (21).

Like a magnetic disc drive, the flying head (22) is fixed on a gimbal portion extending from a rotary actuator. Its moving over the disc is conducted by the rotation of the rotary actuator.

As a material for the reflective film (12) of the magneto-optical recording medium, there can be used, for example, simple substances of noble metals such as Au, Ag, Cu, etc., alloys thereof, alloys of these noble metals and other transition metals such as Si, Ge, Sn, Pb, Al, Ga, In, etc., Al simple substance, and alloys of Al and other metals.

As the recording layer (13), there can be used, for example, rare earth element-transition metal amorphous alloys such as TbFeCo, DyFeCo, DyTbFeCo, GdFeCo, etc., and laminated films of a noble metal (e.g. Co or Pt) and a ferromagnetic transition metal. The alloys may contain Cr, Nb, Pt, Ni, Ta and the like. There may also be used laminates of two or more layers of amorphous alloys having different compositions, and combinations of an amorphous film and a laminated film.

As to the recording and reading-out layer, a transparent ceramic layer of $SiN_x$, $SiO_x$, $SiC_x$, $SiN_xO_y$, $SiC_xO_y$, $SiN_xC_yO_z$, $AlN_x$, $AlO_x$, $AlN_xO_y$, $ZrO_x$, ZnS, $ZnS\text{-}(SiO_2)_x$, $ZrO_x$, $TiO_x$, DLC carbon or the like can be used as the transparent dielectric layer (14). A protective layer of 5 to 10 nm in thickness composed mainly of carbon may be formed on the upper side of the transparent dielectric layer. As the lubricant layer (15), there can be used, for example, perfluoro polyethers, Si-containing lubricants, hydrocarbon lubricants such as stearic acid metal salts and stearic acid esters, and terminally fluorinated hydrocarbon lubricants.

For heat control, a ceramic layer of $SiN_x$, $AlN_x$, $SiC_x$, $SiO_x$, $SiN_xO_y$, $Ge_xN$, $GeN_xO_y$ or the like, a non-magnetic transition metal layer of Ti, Cr, Zr, Nb, Ta or the like, or a semiconductor layer of Si, Ge, ZeS, ZeSe or the like may be formed between the reflective layer (12) and the recording layer (13).

The reflective layer (12) may have a laminated structure composed of two or more layers having different compositions. A ceramic layer or a metal layer may be formed between the reflective layer (12) and the substrate (11) in order to improve the corrosion resistance, adhesive properties and the like.

In order to reduce the track pitch, NA of the objective lens has to be adjusted to 0.8 or more. However, when it is more than 0.95, the production of the lens becomes difficult, resulting in a decreased yield. Therefore, NA of the objective lens is preferably adjusted to 0.95 or less. When such an objective lens having a large NA value is used, the spot size is decreased. Therefore, there is preferably used a substrate for land recording and reading-out or a substrate for groove recording and reading-out, which has a track pitch of 0.9 µm or less. Furthermore, in the case of increasing the packing density, employment of a CAD film as the recording layer can improve the utilization rate of the substrate as compared with employment of only lands or grooves. As to the structure of the recording and reading-out layer in this case, the above-mentioned recording layer (13) portion has a magnetostatic coupling type and CAD type structure with magnetic super-resolution composed of a reading-out layer of GdFeCo, a mask layer of GdFe, a non-magnetic layer and a recording film composed mainly of TbFeCo which are laminated in that order from the light-introduction side. As the non-magnetic layer, there can be used not only ceramic layers of $SiN_x$, $AlN_x$ or the like but also non-magnetic metals such as Al, Ti, Zr, etc. As the CAD layer, an exchange-and-coupling type CAD layer containing no non-magnetic layer can be used. When high-speed access is carried out, as small a lens system as possible is preferably used. In this case, the focal length is also shortened.

On the other hand, the substrate itself involves a runout of tens micrometers in the axial direction at the time when the substrate is incorporated into a spindle. If a servo control method in the optical axis direction (a direction perpendicular to the recording medium surface) employed in a conventional optical recording apparatus is adopted in order to place the focus of the optical system always on the recording layer in accordance with the runout, the structure of a controller becomes complicated with a decrease of the depth of focus in an objective lens system having a large NA value, resulting in an increased cost. Therefore, it is preferable to use an optical head which is obtained by mounting an objective lens on a flying-head type slider and whose flying height is determined by an air bearing. In this case, even if a runout in the direction of rotation axis of the recording medium takes place, the focus of the optical system can be sufficiently placed on the recording layer in accordance with the runout when the runout is in a range of −60 μm to +60 μm. Moreover, the optical axis is always constant relative to the recording film. Accordingly, each aberration due to the inclination of the recording medium to the rotation axis can be kept slight even at a large NA value.

In the present invention, as shown in FIG. 1, the transparent resin layer (31) is formed on the transparent dielectric layer (14) of the recording medium. The transparent resin layer is effective in preventing scratches made by the collision of the flying head with the recording medium, or scratches on the surface of the recording medium made when the recording medium is stored as a removable medium in a cartridge, namely, scratches made by contact between the cartridge and the recording medium owing to dropping of the cartridge. As to the thickness of the transparent resin layer, its average thickness measured in the range of the inner periphery and the outer periphery is preferably not more than 50 μm and not less than 1 μm. When the average thickness if less than 1 μm, the scratch-preventing effect is not sufficient. When the average thickness is more than 50 μm, the nonuniformity of thickness of the transparent resin layer becomes a problem. When the resin is applied by a spin coating method, the resin moves toward the outer peripheral portion owing to centrifugal force applied at the time of shaking-off by spinning. Therefore, the thickness nonuniformity tends to become remarkable with an increase of the thickness. For reducing the nonuniformity, the coated product is preferably allowed to stand after the spin coating. By the virtue of the standing, the resin moves in such a direction that the thickness nonuniformity is removed, owing to the surface tension. However, when this method is adopted, the productivity is decreased with an increase of the standing time. Therefore, the thickness of the transparent resin layer is preferably 50 μm or less in view of the productivity. A lubricant layer is preferably formed on the transparent resin layer. When an antistatic resin is used as the transparent resin layer, electrification by static electricity can be prevented. The surface resistivity of the transparent resin layer is preferably $10^{12}$ Ω or less.

Figure 3:
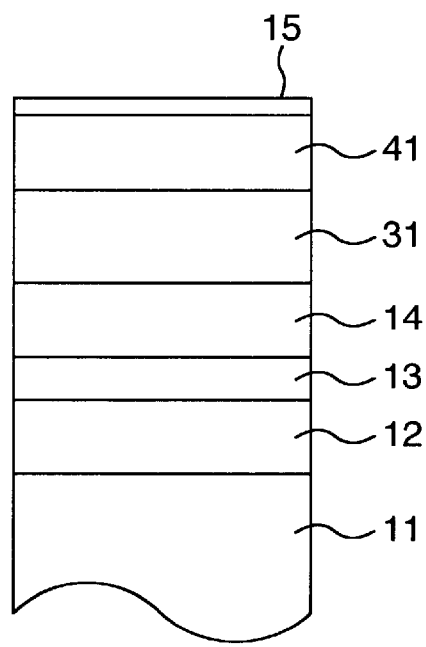
FIG. 3 is a sectional schematic view of the recording medium in the case where another transparent dielectric layer is formed on the transparent resin layer.

As shown in FIG. 3, another transparent dielectric layer (41) may be formed on the transparent resin layer. The formation of this transparent dielectric layer further prevents scratches. The thickness of this transparent dielectric layer is preferably not more than 300 nm and not less than 30 nm. When the thickness is less than 30 nm, no scratch-preventing effect can be obtained. When the thickness is more than 300 nm, the scratch-preventing effect is not markedly enhanced. A sufficient scratch-preventing effect can be obtained at a thickness of 300 nm or less from the viewpoint of economical benefit and productivity. As this transparent dielectric layer, there can be used the same ceramic layer as in the case of the transparent dielectric layer (14), i.e., a ceramic layer of $SiN_x$, $SiO_x$, $SiC_x$, $SiN_xO_y$, $SiC_xO_y$, $SiN_xC_yO_z$, $AlN_x$, $AlO_x$, $AlN_xO_y$, $ZrO_x$, ZnS, $ZnS\text{-}(SiO_2)_x$, $ZrO_x$, $TiO_x$, DLC carbon or the like. A protective layer of 5 to 10 nm in thickness composed mainly of carbon may be formed on the upper side of this transparent dielectric layer. A lubricant layer is preferably formed on this transparent dielectric layer.

The objective lens used in the present invention may have the following structure: it is composed of a combination of two or more lens; the surface of a lens nearest to the film surface side of the magneto-optical recording medium, facing the disc, has a flat shape; and a magnetic-field modulating coil attached to a parallel and flat glass plate is adhered to the flat surface of the lens nearest to the film surface side of the magneto-optical recording medium. Owing to the above-mentioned structure, the glass substrate can easily be located perpendicularly to the optical axis, so that a stable beam of light with well-squeezed profile can be obtained.

In a recording apparatus using the magneto-optical recording medium, a laser having an output wavelength of 450 nm or less is preferably used for further improvement of the packing density.

The present invention is explained below with reference to the drawings.

EXAMPLE 1

A magneto-optical recording medium having the structure shown in FIG. 1 was produced by the process described below.

A substrate (11) for land recording and reading-out having a track pitch of 0.6 μm was produced by injection compression molding by using a stamper having grooves and pits previously formed thereon and a polycarbonate resin. The sizes of the substrate were as follows: diameter 130 mm, thickness 1.8 mm, and diameter of center hole 15 mm. The width of land was 0.4 μm and the depth of groove was 60 nm. Using an in-line DC magnetron sputtering apparatus, on the substrate were formed an Au layer of 50 nm as the reflective layer (12), a TbFeCo alloy layer of 20 nm as the recording and reading-out layer (13), and a combination of a silicon nitride layer of 60 nm and a carbon hydride layer of 10 nm thereon as the components of the transparent dielectric layer (14). Lastly, a layer of a perfluoro polyether lubricant having a hydroxyl group at each end was formed as the lubricant layer (15) by spin coating so as to have an average thickness of 1 nm. The conditions for forming the layers were as follows. The silicon nitride layer was formed by sputtering a silicon target by the use of an Ar—$N_2$ mixed gas (mixing ratio: 2:1) at a flow rate of 130 sccm (degree of vacuum: 2.0 Pa) and an input power of 2 kw. The Au layer was formed by sputtering an Au target by the use of Ar gas at a flow rate of 80 sccm (degree of vacuum: 1.2 Pa) and an input power of 2 kw. The TbFeCo alloy layer was formed by sputtering a $Tb_{23}Fe_{67}Co_{10}$ (at %) alloy target by the use of Ar gas at a flow rate of 100 sccm (degree of vacuum: 1.5 Pa) and an input power of 500 W. The carbon hydride layer was formed by sputtering an amorphous carbon target by the use of an Ar-hydrogen mixed gas (mixing ratio: 4:1) at a gas flow rate of 100 sccm (degree of vacuum: 1.5 Pa) and an input power of 1 kw.

The magneto-optical recording medium thus obtained was incorporated into a drive having a flying head having the structure shown in FIG. 2, and the error rate was measured. The flying head had been attached to an arm attached to a rotary actuator. Magneto-optical recording signals and signals necessary for tracking were detected in a detecting station attached to the root of the arm. There was used a detection system having the same structure as that of a detection system used in a conventional magneto-optical recording apparatus. Tracking was roughly conducted by a push-pull method at first and then finely adjusted by a galvano method. The average height of levitation of the head was 3 µm and the head was loaded onto the recording medium by ramp load. The number of revolutions of the recording medium was 3,600 per minute. The magnetic field produced by the coil of the head was 150 Oe. A method for data modulation was 1-7 (PR class 1).

The error rate was measured at a recording wavelength of 680 nm and an optimum recording power by the use of the above-mentioned drive and found to be $1\times10^{-4}$ or less at a shortest mark length of 350 nm. At this error rate value, the reading-out channel worked sufficiently. When zone CAV was employed at the above shortest mark length, a capacity of about 5 GB could be attained on one side of the disc.

EXAMPLE 2

A magneto-optical recording medium was produced in the same manner as in Example 1, except for using a land/groove substrate having a land width of about 0.45 µm, a groove width of about 0.45 µm, a track pitch of 0.90 µm and a groove depth of 55 nm, and using a CAD film as a recording layer. After an Au layer was formed, a TbFeCo film of 50 nm, a silicon nitride layer of 10 nm, a GdFe layer of 30 nm and then a GdFeCo layer of 30 nm were formed as the components of the CAD recording and reading-out layer. Another silicon nitride layer of 60 nm and then a carbon hydride layer of 10 nm were formed on the GdFeCo layer as the components of a transparent dielectric layer.

The conditions for forming the layers were as follows. The silicon nitride layer was formed by sputtering a silicon target by the use of an Ar—$N_2$ mixed gas (mixing ratio: 2:1) at a flow rate of 130 sccm (degree of vacuum: 2.0 Pa) and an input power of 2 kw. The Au layer was formed by sputtering an Au target by the use of Ar gas at a flow rate of 80 sccm (degree of vacuum: 1.2 Pa) and an input power of 2 kw. The carbon hydride layer was formed by sputtering an amorphous carbon target by the use of an Ar-hydrogen mixed gas (mixing ratio: 4:1) at a gas flow rate of 100 sccm (degree of vacuum: 1.5 Pa) and an input power of 1 kw. As the components of the recording layer, the TbFeCo layer was formed by co-sputtering of Tb and FeCo, the GdFe layer by co-sputtering of Gd and Fe, and the GdFeCo layer by co-sputtering of Gd and FeCo.

The TbFeCo layer was a TM-rich film having a Curie temperature of 230 to 250° C. The GdFe layer was a film with in-plane magnetization having a Curie temperature of 140 to 170° C. The GdFeCo layer was a RE-rich film having a Curie temperature of approximately 300 to 350° C., and it became a film with in-plane magnetization below a temperature of 150 to 180° C. and became a film with perpendicular-magnetization above this temperature. The sputtering conditions for each layer in the recording layer were set so that the above-mentioned characteristics could be attained.

The magneto-optical recording medium thus obtained was incorporated into the same drive as used in Example 1, and the error rate was measured. The flying head had been attached to an arm attached to a rotary actuator. Magneto-optical recording signals and signals necessary for tracking were detected in a detecting station attached to the root of the arm. There was used a detection system having the same structure as that of a detection system used in a conventional magneto-optical recording apparatus. Tracking was roughly conducted by a push-pull method at first and then finely adjusted by a galvano method. The average flying height of the head was 3 µm and the head was loaded onto the recording medium by ramp load. The number of revolutions of the recording medium was 3,600 per minute. The magnetic field produced by the coil of the head was 150 Oe. A method for data modulation was NRZI+PR (1, 1).

The error rate was measured at an optimum recording power by the use of the above-mentioned drive and found to be $1\times10^{-4}$ or less at a mark length of 170 nm. At this error rate value, the reading-out channel worked sufficiently. When zone CAV was employed at the above mark length, a capacity of about 20 GB could be attained on one side of the disc.

EXAMPLE 3

A magneto-optical recording medium was produced in the same manner as in Example 1, except for using a land/groove substrate having a land width of about 0.23 µm, a groove width of about 0.23 µm, a track pitch of 0.46 µm and a groove depth of 35 nm, changing the recording wavelength to 405 nm, and changing the thickness of the silicon nitride layer (14) as transparent dielectric layer to 35 nm.

The magneto-optical recording medium was incorporated into the same drive as used in Example 1, and the error rate was measured. The flying head had been attached to an arm attached to a rotary actuator. Magneto-optical recording signals and signals necessary for tracking were detected in a detecting station attached to the root of the arm. There was used a detection system having the same structure as that of a detection system used in a conventional magneto-optical recording apparatus. Tracking was roughly conducted by a push-pull method at first and then finely adjusted by a galvano method. The average flying height of the head was 3 µm and the head was loaded onto the recording medium by ramp load. The number of revolutions of the recording medium was 3,600 per minute. The magnetic field produced by the coil of the head was 150 Oe. A method for data modulation was NRZI+PR (1, 1).

The error rate was measured at an optimum recording power by the use of the above-mentioned drive and found to be $1\times10^{-4}$ or less at a shortest mark length of 100 nm. At this error rate value, the reading-out channel worked sufficiently. When zone CAV was employed at the above shortest mark length, a capacity of about 40 GB could be attained on one side of the disc.

EXAMPLES 4 TO 10

An ultraviolet-setting resin was applied by a spin coating method on a medium obtained by using the same substrate, the same structure and the same composition of a recording film as in Example 2 except for forming no carbon layer and no lubricant layer. The ultraviolet-setting resin was cured by the use of an ultraviolet lamp to form an ultraviolet-setting resin layer. A silicone-based lubricant was applied on the ultraviolet-setting resin layer. By varying the amount of the ultraviolet-setting resin applied and the number of revolutions for shaking-off, there were produced media having an average thickness of 1, 2, 5, 10, 20 or 50 µm measured in the range from an inner periphery of 20 mm to an outer periphery of 60 mm. In Example 10, no ultraviolet-setting resin layer was formed.

EXAMPLES 11 TO 13

There were produced media having the same structure as in Examples 4 to 10, except that the average thickness of the ultraviolet-setting resin layer was 0.7 µm, 60 µm or 70 µm.

Each of the media of Examples 4 to 10 and Examples 11 to 13 was incorporated into the same drive as used in Example 1, and the degree of scratch of the medium surface (the surface of the ultraviolet-setting resin layer) was investigated while carrying out random seek of the flying head in practice in a radius range of 30 mm to 60 mm. In this test, the number of revolutions of the disc was adjusted to 1,200 per minute and the flying height of the flying head to about 1 μm. The surface condition after the random seek was investigated visually and under an optical microscope (magnifying power: 100 magnifications). The surface condition was evaluated in five grades. The nonuniformity of thickness of the ultraviolet-setting resin layer was also measured. The thickness of the ultraviolet-setting resin layer was measured in a radius range of 20 to 62 mm with a surface profile measuring machine by peeling off portions of the ultraviolet-setting resin layer from each recording medium. From the maximum thickness dmax and the minimum thickness dmin among the measured values, the thickness nonuniformity was calculated according to the expression: (dmax−dmin)/(dmax+dmin)×100 (%) The results are shown in Table 1.

TABLE 1

| | Average thick-ness of ultraviolet-setting resin layer (μm) | Surface condition after 100 hours of seek | Thickness nonuniformity (%) |
|---|---|---|---|
| Example 4 | 1 | 3 | 1.5 |
| Example 5 | 2 | 3 | 1.4 |
| Example 6 | 5 | 4 | 1.5 |
| Example 7 | 10 | 4 | 2.2 |
| Example 8 | 20 | 5 | 3.5 |
| Example 9 | 50 | 5 | 5.0 |
| Example 10 | 0 | 1 | — |
| Example 11 | 0.7 | 3 | 1 |
| Example 12 | 60 | 5 | 7.2 |
| Example 13 | 70 | 5 | 8.0 |

The surface condition after the seek for 100 hours was evaluated as follows:

5: No scratch was observed either visually or under the microscope.

4: No scratch was visually observed but several scratches were observed all over the disc surface under the microscope.

3: A scratch was visually observed but was partial (a circular scratch forming about one-fifth of a circle around the center of the disc). Numberless tiny scratches were observed under the microscope.

2: There were visually observed several scratches each forming substantially one-half to the whole of a circle around the center of the disc. In addition to these scratches, 10 slight scratches were visually observed and numberless tiny scratches were observed under the microscope.

1: There were visually observed 10 or more scratches each forming substantially one-half to the whole of a circle around the center of the disc. In addition to these scratches, numberless slight scratches were visually observed and numberless tiny scratches were observed under the microscope.

When the surface condition received the grade of 3, it was judged eligible for practical use.

As can be seen from Table 1, the reception of scratches during the seek can be suppressed so as to be permissible, by forming the transparent resin layer in a thickness of 1 μm or more. On the other hand, the nonuniformity of thickness of the transparent resin layer is increased with an increase of the thickness of the transparent resin layer. Since the thickness nonuniformity is preferably 5% or less, the thickness of the transparent resin layer is preferably 50 μm or less.

EXAMPLES 14 TO 17

An ultraviolet-setting resin was applied by a spin coating method on a medium obtained by using the same substrate, the same structure and the same composition of a recording film as in Example 2 except for forming no carbon layer and no lubricant layer. The ultraviolet-setting resin was cured by the use of an ultraviolet lamp to form an ultraviolet-setting resin layer having an average thickness of 5 μm. An SiN layer was formed thereon in a thickness of 20, 90, 190 or 290 nm, and a carbon layer was formed in a thickness of 10 nm on the SiN layer. The thickness of the transparent dielectric layer composed of these layers was 30, 100, 200 or 300 nm. A perfluoro polyether lubricant was applied on the transparent dielectric layer.

EXAMPLES 18 TO 20

The same substrate, the same structure and the same composition of a recording layer as in Example 2 were employed except for forming an SiN layer in a thickness of 10, 390 or 490 nm on the transparent resin layer and forming a carbon layer in a thickness of 10 nm on the SiN layer. The thickness of the transparent dielectric layer composed of these layers was 20, 400 or 500 nm. A perfluoro polyether lubricant was applied on the transparent dielectric layer.

For each of the media of Examples 14 to 17 and Examples 18 to 20, the degree of scratch of the medium surface was investigated by exactly the same method as for the investigation of the degree of scratch of the medium surface after the random seek in Examples 4 to 10 and Examples 11 to 13. The results are shown in Table 2.

TABLE 2

| | Thickness of transparent dielectric layer on ultra-violet-setting resin layer (μm) | Surface condition after 100 hours of seek |
|---|---|---|
| Example 14 | 30 | 4 |
| Example 15 | 100 | 4 |
| Example 16 | 200 | 5 |
| Example 17 | 300 | 5 |
| Example 18 | 20 | 3 |
| Example 19 | 400 | 5 |
| Example 20 | 500 | 5 |

The preventive effect on the reception of scratches by the medium surface during the seek of the flying head is improved by the formation of the transparent dielectric layer of 30 nm or more on the transparent resin layer. The scratch resistance is substantially saturated when the thickness of the transparent dielectric layer is more than 300 nm.

EXAMPLE 21

Figure 4:
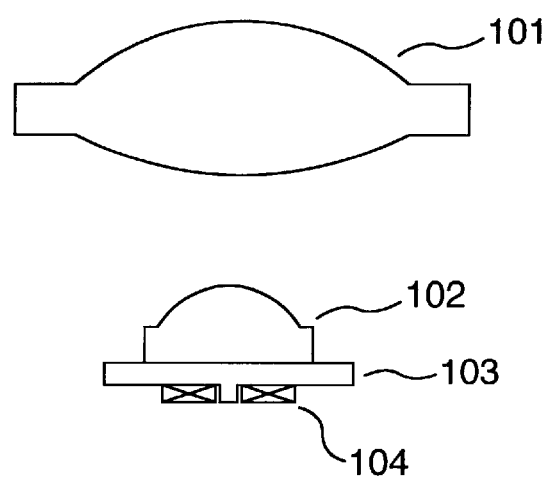
FIG. 4 is a schematic illustration of an optical-head pickup and a magnetic-field modulating coil which are used in the present invention.

The magneto-optical recording medium of the Example 1 was incorporated into a drive having a head having the structure shown in FIG. 4 and the error rate was measured.

FIG. 4 is a schematic illustration of a pickup consisting of an objective lens and a magnetic-field modulating coil.

As shown in FIG. 4, the objective lens is composed of two lenses, i.e., a first lens 101 and a second lens 102. The surface of the second lens 102 located on the disc side, facing the disc, is composed of a plane. NA of the objective lens was adjusted to 0.85. A magnetic-field modulating coil 104 formed on a substrate for magnetic-field modulating coil 103 made of glass is adhered to the surface of the second lens 102 which faces the disc and is composed of a plane.

Although not shown, the objective lens and the magnetic-field modulating coil are incorporated into an actuator for focus servo and tracking servo.

The flying head had been attached to an arm attached to a rotary actuator. Magneto-optical recording signals and signals necessary for tracking were detected in a detecting station attached to the root of the arm. There was used a detection system having the same structure as that of a detection system used in a conventional magneto-optical recording apparatus. Tracking was roughly conducted by a push-pull method at first. The number of revolutions of the recording medium was 3,600 per minute. The magnetic field produced by the coil of the head was 150 Oe. A method for data modulation was 1-7 (PR class 1).

The error rate was measured at an optimum recording power by the use of the above-mentioned drive and found to be $1 \times 10^{-4}$ or less at a mark length of 350 nm. At this error rate value, the reading-out channel worked sufficiently. When zone CAV was employed at the above mark length, a capacity of about 5 GB could be attained on one side of the disc.

Industrial Applicability

The recording density is improved by the use of a magneto-optical recording apparatus using a magneto-optical recording medium characterized by comprising a substrate and at least a reflective film, a recording layer, a transparent dielectric layer and a lubricant layer which are laminated on the substrate in that order; and a flying head incorporated with an objective lens having a numerical aperture (NA) of not more than 0.95 and not less than 0.8, wherein recording or reading-out is conducted from the film surface side.

The recording density is further improved by the use of a magneto-optical recording medium comprising a land/groove recording substrate having a track pitch of 0.45 $\mu$m or less and a recording layer which is formed thereon according to the above-mentioned structure, is of a CAD type and has a magnetic super-resolution.

The resistance to scratches given by the contact with the head is improved by the formation of a transparent resin layer or a combination of a transparent resin layer and another transparent dielectric layer on the transparent dielectric layer.

Furthermore, a stable beam of light with well-squeezed profile can be obtained to reduce the error rate, when the objective lens has the following structure: it is composed of a combination of two or more lens; the surface of a lens nearest to the film surface side of the magneto-optical recording medium, facing the disc, has a flat shape; and a magnetic-field modulating coil attached to a parallel and flat glass plate is adhered to the flat surface of the lens nearest to the film surface side of the magneto-optical recording medium.

What is claimed is:

1. A magneto-optical recording medium for conducting recording or reading-out from the film surface side of the recording medium by traveling of a flying head incorporated with an objective lens having a numerical aperture (NA) of not more than 0.95 and not less than 0.8, wherein at least a reflective film, a recording layer, a transparent dielectric layer, a transparent resin layer and a lubricant layer are laminated on a substrate in that order, and wherein lands or grooves are formed on the substrate so as to permit land recording, groove recording or land groove recording at a track pitch of 0.9 $\mu$m or less.

2. The magneto-optical recording medium according to claim 1, wherein the recording layer is a CAD (center aperture detection) type magneto-optical recording and reading-out layer.

3. The magneto-optical recording medium according to claim 1, wherein the transparent resin layer is formed in a thickness of not more than 50 $\mu$m and not less than 1 $\mu$m, and the lubricant layer is formed thereon.

4. The magneto-optical recording medium according to claim 3, wherein a transparent dielectric layer is formed in a thickness of not more than 300 nm and not less than 30 nm on the transparent resin layer, and the lubricant layer is formed thereon.

5. A magneto-optical recording apparatus which uses a magneto-optical recording medium obtained by laminating at least a reflective film, a recording layer, a transparent dielectric layer and a lubricant layer on a substrate in that order, and in which a flying head incorporated with an objective lens having a numerical aperture (NA) of not more than 0.95 and not less than 0.8 is located so as to face the film surface side of the magneto-optical recording medium, and wherein lands or grooves are formed on the substrate so as to permit land recording, groove recording or land groove recording at a track pitch of 0.9 $\mu$m.

6. The magneto-optical recording apparatus according to claim 5, which uses the magneto-optical recording medium whose recording layer is a CAD (center aperture detection) type magneto-optical recording and reading-out layer.

7. The magneto-optical recording apparatus according to claim 5, which uses a magneto-optical recording medium obtained by forming a transparent resin layer in an average thickness of not more than 50 $\mu$m and not less than 1 $\mu$m on the transparent dielectric layer of the magneto-optical recording medium, and forming the lubricant layer thereon.

8. The magneto-optical recording apparatus according to claim 7, which uses a magneto-optical recording medium obtained by forming a transparent dielectric layer in a thickness of not more than 300 nm and not less than 50 nm on the transparent resin layer, and forming the lubricant layer thereon.

9. The magneto-optical recording apparatus according to claim 5, wherein the output wavelength of a laser for recording is 450 nm or less.

10. The magneto-optical recording apparatus according to claim 5, wherein the objective lens is composed of a combination of two or more lens; the surface of a lens nearest to the film surface side of the magneto-optical recording medium, facing the disc, has a flat shape; and a magnetic-field modulating coil attached to a parallel and flat glass plate is adhered to the flat surface of the lens nearest to the film surface side of the magneto-optical recording medium.

* * * * *